(12) United States Patent
Andreae (10) Patent No.: US 11,072,501 B2
(45) Date of Patent: Jul. 27, 2021

(54) FINISHING SYSTEM AND METHOD OF OPERATING

(71) Applicant: SST Systems, Inc., Sturgeon Bay, WI (US)

(72) Inventor: Chad Martin Andreae, Sturgeon Bay, WI (US)

(73) Assignee: SST Systems, Inc., Sturgeon Bay, WI (US)

( * ) Notice: Subject to any disclaimer, the term of this patent is extended or adjusted under 35 U.S.C. 154(b) by 36 days.

(21) Appl. No.: 16/745,034

(22) Filed: Jan. 16, 2020

(65) Prior Publication Data

US 2020/0407177 A1    Dec. 31, 2020

Related U.S. Application Data

(60) Provisional application No. 62/867,398, filed on Jun. 27, 2019.

(51) Int. Cl.
| | |
|---|---|
| *B65G 49/04* | (2006.01) |
| *B65G 49/02* | (2006.01) |
| *B65G 47/90* | (2006.01) |
| *B65G 47/46* | (2006.01) |
| *B65G 47/96* | (2006.01) |
| *B65G 1/04* | (2006.01) |

(52) U.S. Cl.
CPC ........... *B65G 47/901* (2013.01); *B65G 47/46* (2013.01); *B65G 47/962* (2013.01); *B65G 1/0492* (2013.01); *B65G 2201/0294* (2013.01); *B65G 2811/0678* (2013.01)

(58) Field of Classification Search
CPC ........ B65G 49/02; B65G 49/04; B65G 47/46; B65G 47/901; B65G 47/962

USPC .............. 198/343.1, 346.1, 346.3, 347.4
See application file for complete search history.

(56) References Cited

U.S. PATENT DOCUMENTS

| | | | | |
|---|---|---|---|---|
| 4,772,374 | A | * | 9/1988 | Urquhart ............ B65G 49/0459 118/409 |
| 5,433,783 | A | * | 7/1995 | Ichinose ............ B65G 49/0459 118/416 |

(Continued)

OTHER PUBLICATIONS

"Versatile Conveyor System for Coating Processes", VarioShuttle v.4 Catalog, 2013, Eisenmann, (2 pages).

(Continued)

*Primary Examiner* — Douglas A Hess
(74) *Attorney, Agent, or Firm* — Michael Best & Friedrich LLP (57) ABSTRACT

A finishing system includes a workpiece carrier configured to hold a workpiece, and a plurality of work stations arranged in a row along an axis defining a process line, each of the plurality of work stations configured to receive the workpiece and treat the workpiece. A hoist runway, including fixed and movable rail sections, extends along the plurality of work stations of the process line. A hoist is movable along the hoist runway to traverse the plurality of work stations, the hoist coupled to the workpiece carrier to raise and lower the workpiece carrier and to move the workpiece carrier along the process line. A side transfer mechanism moves the movable rail section, with the hoist situated thereon, in a direction transverse to the axis so that the hoist is movable out of the process line.

20 Claims, 7 Drawing Sheets

(56) References Cited

U.S. PATENT DOCUMENTS

| | | | | |
|---|---|---|---|---|
| 6,854,583 B1* | 2/2005 | Horn | ................... | B65G 49/064 |
| | | | | 198/346.2 |
| 6,902,051 B2* | 6/2005 | Dehne | ................ | B65G 49/0459 |
| | | | | 198/346.3 |
| 6,991,087 B2* | 1/2006 | Krannich | .................. | B05C 3/10 |
| | | | | 118/416 |
| 7,480,976 B2* | 1/2009 | Reed | ................... | C23C 14/3414 |
| | | | | 29/563 |
| 8,196,731 B2* | 6/2012 | Spangler | .............. | B65G 35/066 |
| | | | | 198/345.3 |
| 8,459,442 B2* | 6/2013 | Morimoto | ......... | H01L 21/67727 |
| | | | | 198/468.6 |
| 8,522,957 B2* | 9/2013 | Robbin | .............. | B65G 49/0459 |
| | | | | 198/406 |
| 8,561,780 B2* | 10/2013 | Albeck | .............. | B65G 49/0463 |
| | | | | 198/346.3 |
| 8,881,297 B2* | 11/2014 | Gonzalez | ................ | G06F 21/44 |
| | | | | 726/26 |
| 9,016,464 B2* | 4/2015 | Andreae | .................. | C25D 7/00 |
| | | | | 198/678.1 |
| 9,227,786 B2* | 1/2016 | Kozasa | .................. | B65G 17/32 |
| 9,422,017 B2* | 8/2016 | Waki | ...................... | B62D 65/18 |
| 10,106,337 B2* | 10/2018 | Robbin | .............. | B65G 49/0463 |

OTHER PUBLICATIONS

"E-DIP automobile paint line system", Youtube video, Feb. 20, 2014, https://www.youtube.com/watch?v=0oubciaJCN4, (3 pages).
"Eisenmann—VarioShuttle v4", Youtube video, Dec. 15, 2010, https://www.youtube.com/watchv=XyrWP4yNvXg , (3 pages).

\* cited by examiner

FINISHING SYSTEM AND METHOD OF OPERATING

CROSS-REFERENCE TO RELATED APPLICATIONS

This application claims priority to U.S. Provisional Patent Application No. 62/867,398, filed on Jun. 27, 2019, the entire contents of which are incorporated by reference herein.

BACKGROUND

The present invention relates to finishing systems and processes for manufactured parts, and more particularly to conveyors and carriers for transporting manufactured parts through a finishing process, and methods relating to the same. For example, a finishing process can include an electrophoretic deposition (EPD) or e-coating process, whereby manufactured parts are immersed in one or a sequential plurality of fluids. One such machine is described in U.S. Pat. No. 4,772,374, the entire contents of which are hereby incorporated by reference. As another example, a finishing process can include electroplating, whereby manufactured parts are also immersed in one or a sequential plurality of fluids to provide a metal coating on the parts.

Figure 2:
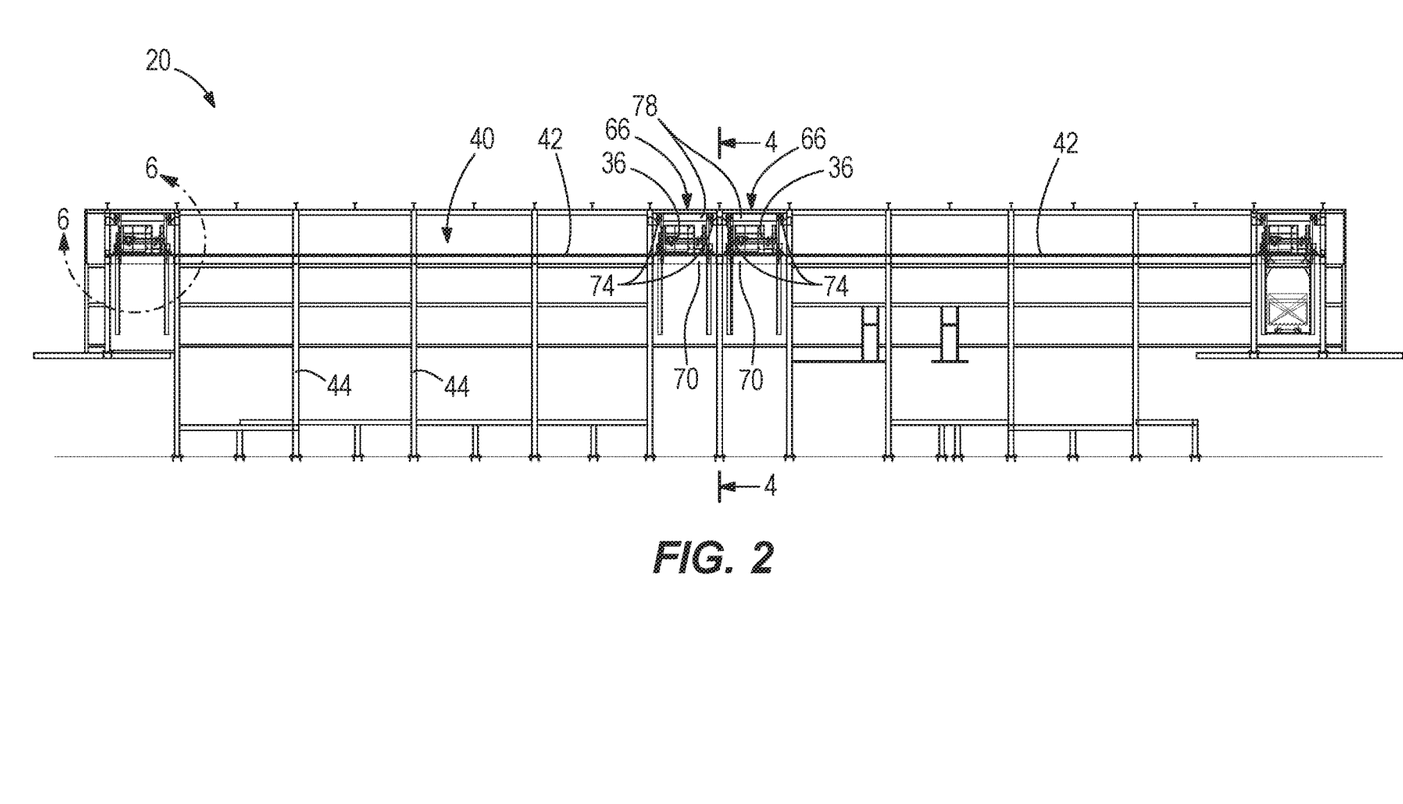
FIG. 2 is a cross-section view of the finishing system taken along line 2-2 of FIG. 1.

The electropainting system disclosed in U.S. Pat. No. 4,772,374 includes at least one movable crane 22 that operates to transfer a workpiece 36 such as a car body held in a carrier unit 30 along a plurality of process stations, or tanks 20. The crane 22 is drivable to move lengthwise along the process line on a pair of elevated horizontal supports 32, 34. Once transported to a next-in-line workstation 20, lift motors 60 of the crane 22 are operated to lower the carrier unit 30 and the workpiece 36 into the process station 20. The crane 22 also operates to oscillate the carrier unit 30 and the workpiece 36 in the process station 20. The crane 22 then operates to lift the carrier unit 30 and the workpiece 36 from the process station 20, before continuing down the process line to the next process station 20. As shown in FIG. 2 with the carrier unit 30 removed, the crane 22 includes a hoist cart 40 and a pair of vertical hoist masts 70, 72. Although the crane 22 may selectively disengage a carrier unit 30 within a predetermined process station 20, thus temporarily "dropping off" a workpiece 36, movement of the crane 22 is constrained to the linear movement along the process line between the first and last process stations 20.

SUMMARY

In one aspect, the invention provides a finishing system including a workpiece carrier configured to hold a workpiece, and a plurality of work stations arranged in a row along an axis defining a process line, each of the plurality of work stations configured to receive the workpiece and treat the workpiece. A hoist runway, including fixed and movable rail sections, extends along the plurality of work stations of the process line. A hoist is movable along the hoist runway to traverse the plurality of work stations, the hoist coupled to the workpiece carrier to raise and lower the workpiece carrier and to move the workpiece carrier along the process line. A side transfer mechanism is configured to move the movable rail section, with the hoist situated thereon, in a direction transverse to the axis so that the hoist is movable out of the process line.

In another aspect, the invention provides a method of operating a finishing system. A plurality of work stations is arranged in a row along an axis defining a process line. A workpiece carrier is loaded with a workpiece. A hoist is provided to be movable along a runway extending along the plurality of work stations of the process line, and the hoist is operated to raise and lower the workpiece carrier and the workpiece at one or more of the plurality of work stations so that the workpiece is treated at one or more of the plurality of work stations. The hoist is operated along the runway onto a movable rail section of the runway. A side transfer mechanism is operated to move the movable rail section, with the hoist situated thereon, in a direction transverse to the axis so that the hoist is moved out of the process line.

In yet another aspect, the invention provides a finishing process line including multiple work stations arranged in each of two discontinuous sections. The finishing process line includes plurality of hoists, each of the plurality of hoists designated for a corresponding workpiece and workpiece carrier throughout the finishing process line so that each workpiece and its associated workpiece carrier is handled by the one corresponding hoist throughout the finishing process line. A side transfer mechanism is positioned at a downstream end of a first section of the two sections and operable to move between the downstream end of the first section and an upstream end of a second section of the two sections. The side transfer mechanism is operable to transfer a workpiece, its associated workpiece carrier, and the corresponding hoist from the downstream end of the first section to the upstream end of the second section.

In yet another aspect, the invention provides a method of operating the finishing process line, including operating the lateral hoist transfer to move a workpiece, its associated workpiece carrier, and the corresponding hoist from the first location in line with the first section to the second location in line with the second section. In some aspects, a plurality of workpieces are present at various work stations throughout the finishing process line at a single time, and at no time is any hoist disengaged from a workpiece and its workpiece carrier and engaged with a different workpiece and its workpiece carrier between an upstream end of the first section and a downstream end of the second section.

In yet another aspect, the invention provides a finishing process line that includes multiple work stations in each of two unaligned, side-by-side sections. A plurality of hoists are provided, each hoist operable to engage a workpiece carrier that supports a workpiece to be finished by at least one coating applied at one of the work stations. Each of the plurality of hoists circulates through the two sections of the finishing process line in a single forward direction, and returns from a downstream end of the second section to an upstream end of the first section in a forward direction (in some cases with no movement in a reverse direction).

In yet another aspect, the invention provides a method of operating a finishing process line to convey a plurality of workpieces through a plurality of work stations. Each of the workpieces is associated with exactly one hoist for conveyance through all of the plurality of work stations. Each hoist traverses the entire finishing process line and operates to raise and lower the associated workpiece at one or more of the plurality of work stations.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
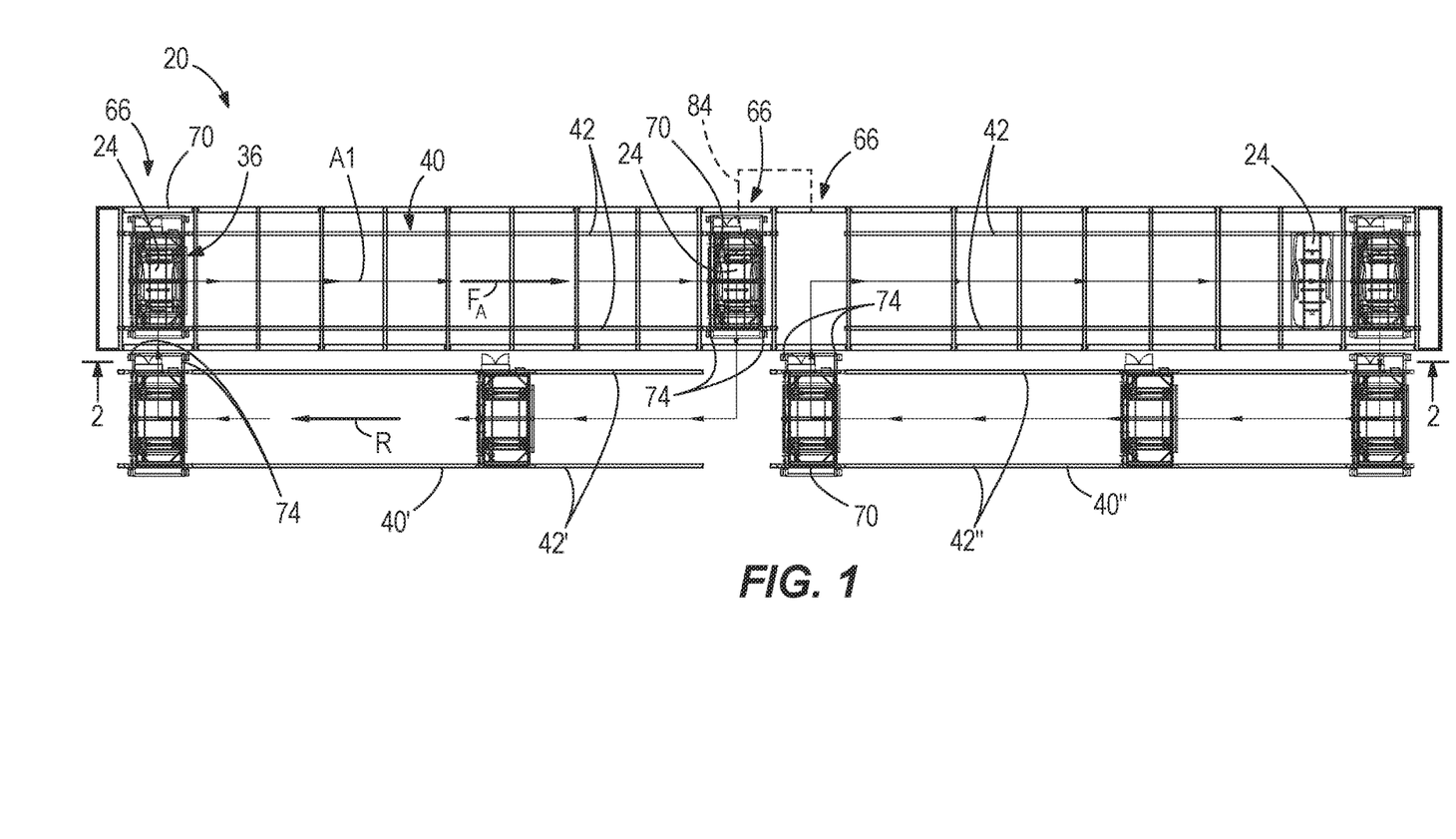
FIG. 1 is a plan view of a finishing system according to one embodiment of the present disclosure.

FIGS. 1 and 2 illustrate a finishing system 20 with a plurality of work stations forming a process line extending along an axis A1 as shown in the plan view of FIG. 1. Arrow $F_A$ illustrates the direction of forward travel through the work stations (i.e., left to right as shown in FIGS. 1 and 2). Some or all of the work stations can include immersion tanks filled with liquid for cleaning, rinsing, and coating workpieces 24 conveyed through the process line. In some constructions, the finishing system 20 can further include additional non-immersion work stations, such as spray stations, heating or oven sections, or inspection stations, among others. In any case, each work station is configured to treat the workpiece(s) 24 in some manner. Additional stations along the process line may be provided for other purposes besides workpiece treatment, e.g., inspection, queueing, workpiece handling. In some constructions, the work stations of the finishing system 20 can include combinations of the following, and in some cases all of the following in sequence: Spray Pre-Clean/Deluge; Spray Alkaline Cleaner; Immersion Alkaline Cleaner; Spray DI/RO Rinse; Immersion DURO Rinse; Immersion Conversion Coating; Spray DI/RO Rinse; Immersion DI/RO Rinse; Immersion E-Coat with Halo Rinse; Spray Permeate Rinse; and Immersion Permeate Rinse. Thus, different forms of treatment are performed by the different work stations as part of one overall finishing process (e.g., e-coating, or electroplating). As described below, the work stations may be subdivided into different portions or groups, such as a pre-treatment portion (i.e., treatments prior to application of a finish or "coating" onto the workpiece), and a coating portion. The coating portion may also include post-treatment work stations for treating the workpiece 24 after the coating is applied (e.g., for enhancing, curing, or completing the coating). As illustrated, the axis A1 of the process line is a straight line, as the row of work stations are laid out in a linear row. Although less common, it is also possible for the work stations to be laid out along an arc, curve, or other non-linear row such that the corresponding axis is non-linear.

In some constructions, the workpiece 24 can be an automobile unibody-constructed frame. The workpiece 24 is supported on a platform or skid 28, which in turn is supported by a workpiece carrier 32. Movable body portions (e.g., doors, hood, trunk lid, etc.) can be attached to the automobile frame or separately attached to a workpiece carrier that is the same or different than the carrier 32 carrying the automobile frame. In other constructions, the workpiece 24 can be another type of metallic or non-metallic manufactured component or assembly. In some constructions, the carrier 32 can have a construction as disclosed in U.S. Pat. No. 9,409,730 incorporated by reference herein, to perform enhanced tilting of the skid 28 and the workpiece 24.

Figure 3:
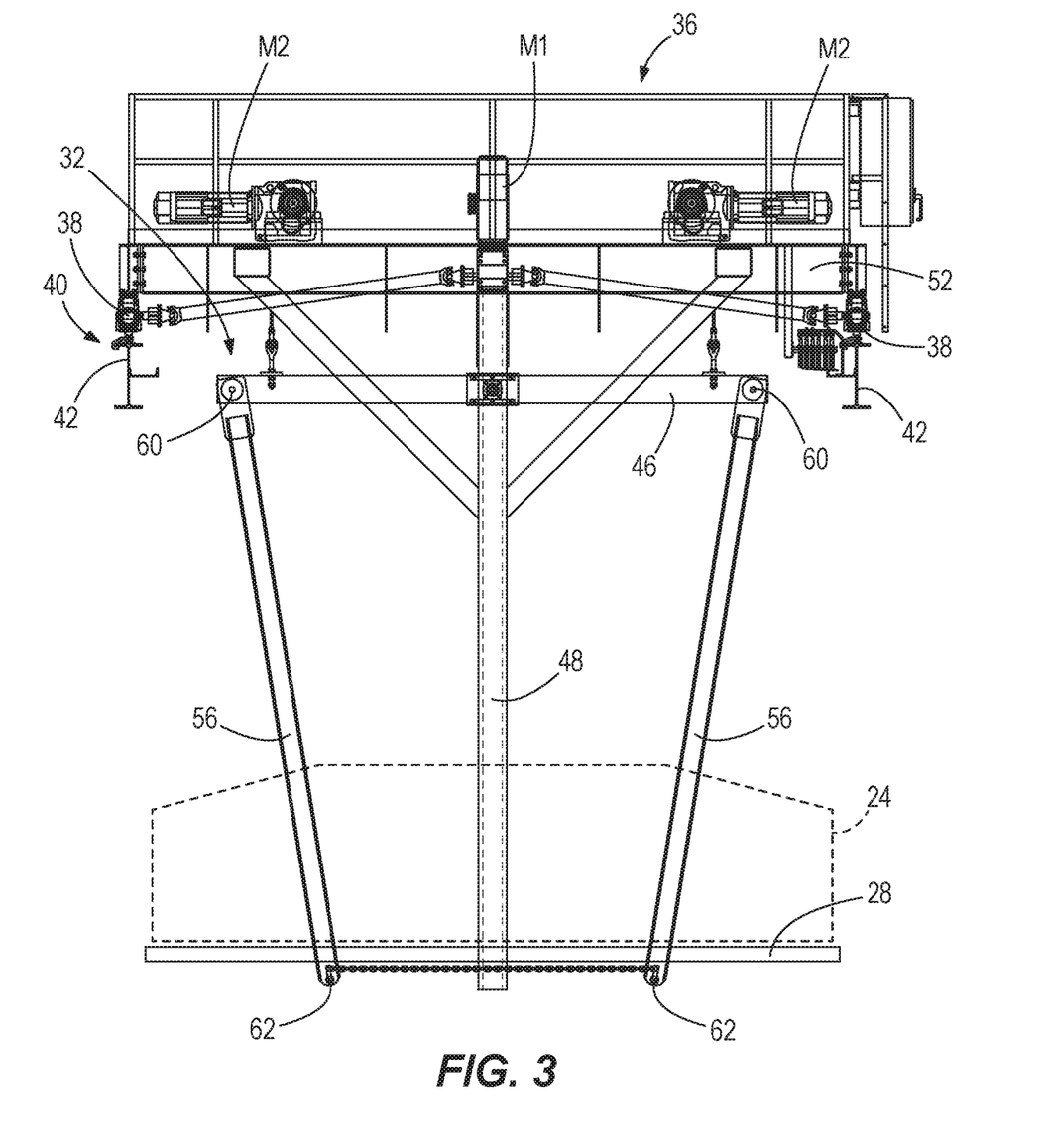
FIG. 3 is a down-the-line view, or end view, of a hoist and a workpiece carrier of the finishing system.

The carrier 32 is suspended from a hoist 36 (e.g., overhead crane unit), shown in greater detail in FIG. 3, as viewed along the axis A1, or "down-the-line," referring to the process line. The hoist 36 is movable along a runway 40 formed with one or more rails (e.g., horizontal rails). The runway 40 is supported above the ground by a plurality of support posts 44 (see also FIGS. 1-2) that laterally flank the process line. Further, as discussed below, the runway 40 can include fixed 42 and movable 70 rail sections. The hoist 36 is configured for movement (e.g., by an on-board drive, which may include one or more electric motors M1) along the runway 40 to traverse the work stations of the process line formed by the finishing system 20. In particular, the hoist 36 conveys the associated workpiece 24, via the carrier 32, along the process line axis A1. The hoist 36 is further configured to raise and lower the workpiece 24, via raising and lowering of the carrier 32 suspended therefrom. The hoist 36 may or may not lower and raise the workpiece 24 at each one of the plurality of work stations. However, in addition to moving the workpiece 24 between work stations, the hoist 36 operates, at work stations in which the workpiece 24 is immersed in a liquid bath, to lower the workpiece 24 into the liquid bath, and to raise the workpiece 24 out of the liquid bath. The hoist 36 may further operate to tilt or oscillate the workpiece 24 through selective manipulation of separate ends or sides of the carrier 32, such that the workpiece 24 is reoriented from a nominal orientation at least once either in the liquid bath, directly above the liquid bath, or both.

The hoist 36 or portions thereof may be of conventional construction, well-known to those of ordinary skill in the art. In many aspects, the hoist 36 may be similar to the crane 22 disclosed in U.S. Pat. No. 4,772,374, the entire contents of which are incorporated by reference. The hoist 36 can include motor-driven rollers 38 driven by the on-board motor(s) M1 for moving the hoist 36 along the runway 40. The hoist 36 can further include one or more lift motors M2 for raising and lowering the carrier 32 (e.g., by letting out or reeling in cables, belts, chains, or other flexible elongated elements coupled to an upper portion 46 of the carrier 32 formed as a bar or frame). Also, vertical masts 48 are provided at opposing ends of the hoist 36, each extending downward from an upper hoist frame 52, or "cart" (FIG. 3). Unlike the vertical masts disclosed in U.S. Pat. No. 4,772,374, the vertical masts 48 of the hoist 36 are arranged in the fore/aft direction, i.e., spaced along the axis A1, rather than along the lateral sides flanking the axis A1. Advantages of this orientation will become apparent by the following description, although aspects of the invention may also be enjoyed with hoists having vertical masts arranged along the lateral sides, among other variations of hoist constructions from those illustrated and described explicitly herein. FIG. 3 further illustrates the carrier 32 having a plurality of links 56, the links 56 defining respective upper and lower pivots 60, 62 at the respective ends thereof. The lower pivots 62 form disengagement points or slip joints with the skid 28. For example, the skid 28 can be detached from the carrier 32 by lowering the carrier 32 when the skid 28 is placed on an alternate support. The finishing system 100 can include a plurality of such hoists 36 for conveying a plurality of carriers 32 and workpieces 24 carried by the carriers 32. Each hoist 36 can be operated independently as a standalone unit by an on-board controller, which in some cases is controlled (e.g., wirelessly) through signals from a remote computer acting as a master controller.

Although it is possible in some constructions for each hoist 36 and carrier 32 to be loaded with a given workpiece 24 and for that workpiece 24 to be conveyed through the entire finishing system 20 by that single hoist 36 and carrier 32 (e.g., in some cases, without separation at any point), the finishing system 20 may be configured and operated to perform "handoffs" of some or all of the workpieces 24 as they traverse the work stations of the finishing system 20. When configured to perform handoffs, a workpiece 24 is initially conveyed through one or more work stations by a first hoist 36 and later conveyed through one or more additional work stations of the finishing system 20 by a different hoist 36. This type of handoff among hoists may be repeated one or more times along the finishing system 20. Exemplary components and method steps for accomplishing such handoffs are described in detail below. Further, finishing system design aspects according to the descriptions and drawings contained herein may enable simplified changes, or modularity, to a finishing system originally installed for a particular finishing process line (e.g., changing the number or type of work stations, and/or changing the layout, including deviation from the single process line axis A1). Moreover, a finishing system may be installed and/or put into production for operating without handoffs (or with a first handoff arrangement), and then modified with limited rebuilding to operate with handoffs (or with an alternate handoff arrangement).

Various advantages, including those briefly mentioned above, may be realized by implementing one or more lateral hoist transfers along the finishing system 20 that forms the process line. In particular, a side transfer mechanism 66 enables selective movement of the hoist 36 off of the process line (i.e., laterally away from the axis A1). As illustrated, the side transfer mechanism 66 operates to shift the hoist 36 off the process line by moving a movable rail section 70 of the hoist runway 40 out of alignment with fixed rail section(s) 42 of the hoist runway 40. Thus, the hoist runway 40, which is formed of discontinuous railing, has a gap introduced therein when the movable rail section 70 is moved by the side transfer mechanism 66. Where the hoist runway 40 includes a pair of horizontally-spaced rails, the movable rail section 70 also includes a pair of horizontally-spaced rails so that the movable rail section 70 can, at the designated location along the process line, form a portion of the runway 40 for the hoist(s) 36. The movable rail section 70 is moved in a direction transverse to the axis A1 of the process line (i.e., transverse to the forward process direction through the finishing system 20). Movement of the movable rail section 70 to accomplish the lateral hoist transfer is defined and/or guided by a transverse shuttle track 74, provided for example by a pair of spaced, parallel rails. The transverse shuttle track 74 can be fixed along the support posts 44. The movable rail section 70 can be moved along the transverse shuttle track 74 by a cart 78 including one or more motors 80 and associated rollers. The movable rail section 70 can be fixedly secured to the cart 78 in some constructions (e.g., the movable rail section 70 forming an integral part of the cart, or a frame thereof). In other constructions, the cart 78 may selectively engage and disengage the movable rail section 70 for performing the lateral hoist transfer. Although aspects of the invention may be realized with as few as one side transfer mechanism 66 and one movable rail section 70 along the finishing system 20, the illustrated construction provides four such side transfer mechanisms 66 and, correspondingly at these locations, four movable rail sections 70. Numerous operational processes may be afforded by the introduction of one or more side transfer mechanisms 66 to perform a lateral hoist transfer, and some of these are discussed further below.

Figure 4:
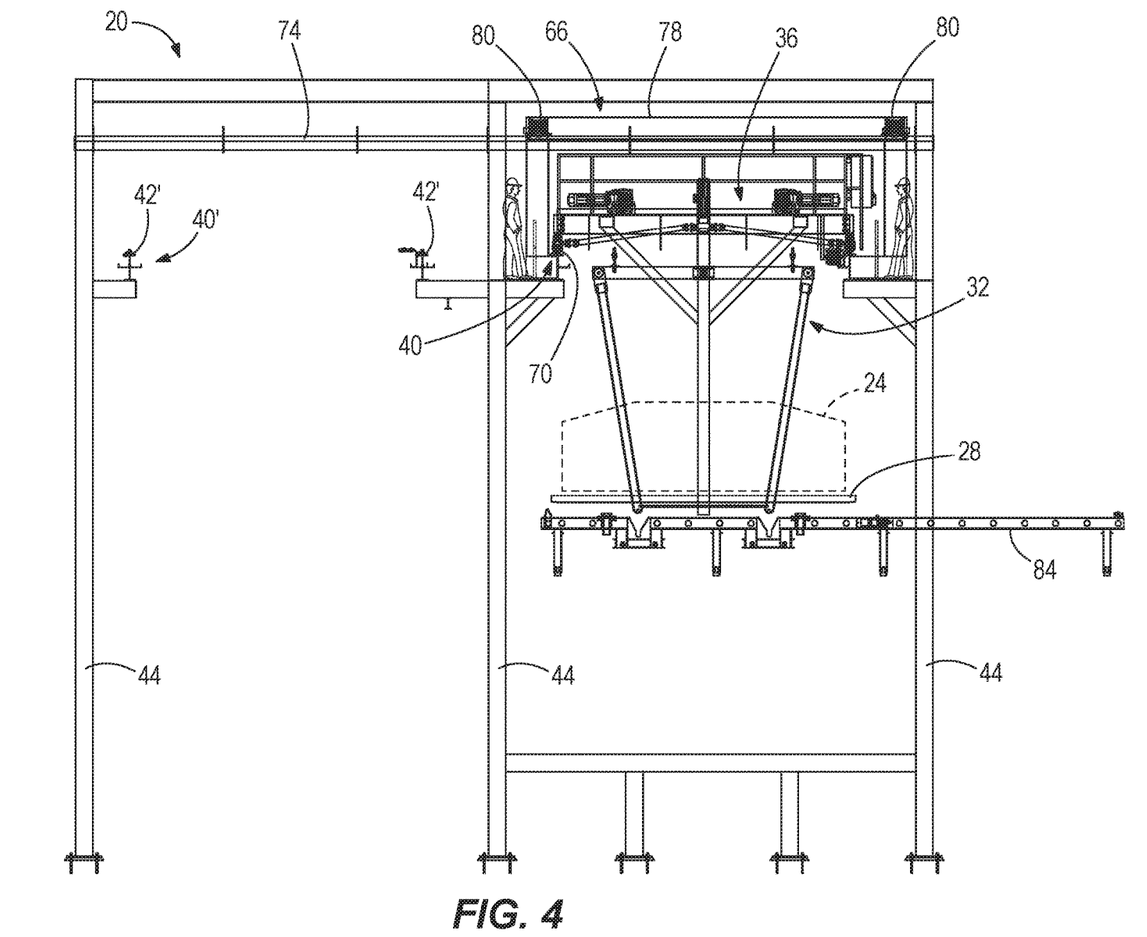
FIG. 4 is a cross-section view of the finishing system, taken along line 4-4 of FIG. 2 at the location of a side transfer mechanism.
Figure 5:
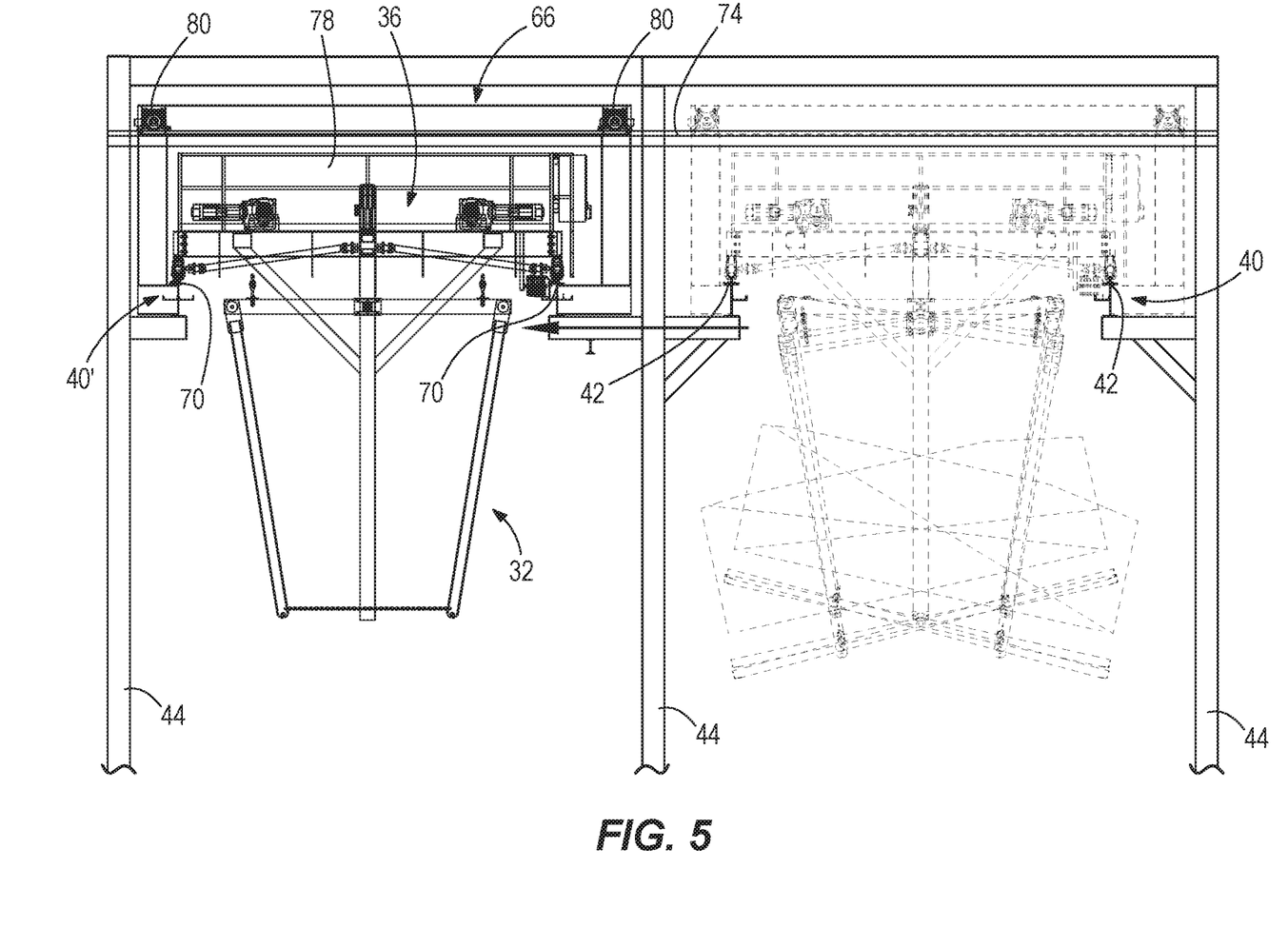
FIG. 5 is a view of the finishing system as shown in FIG. 4, following actuation of the side transfer mechanism to complete a lateral hoist transfer.
Figure 6:
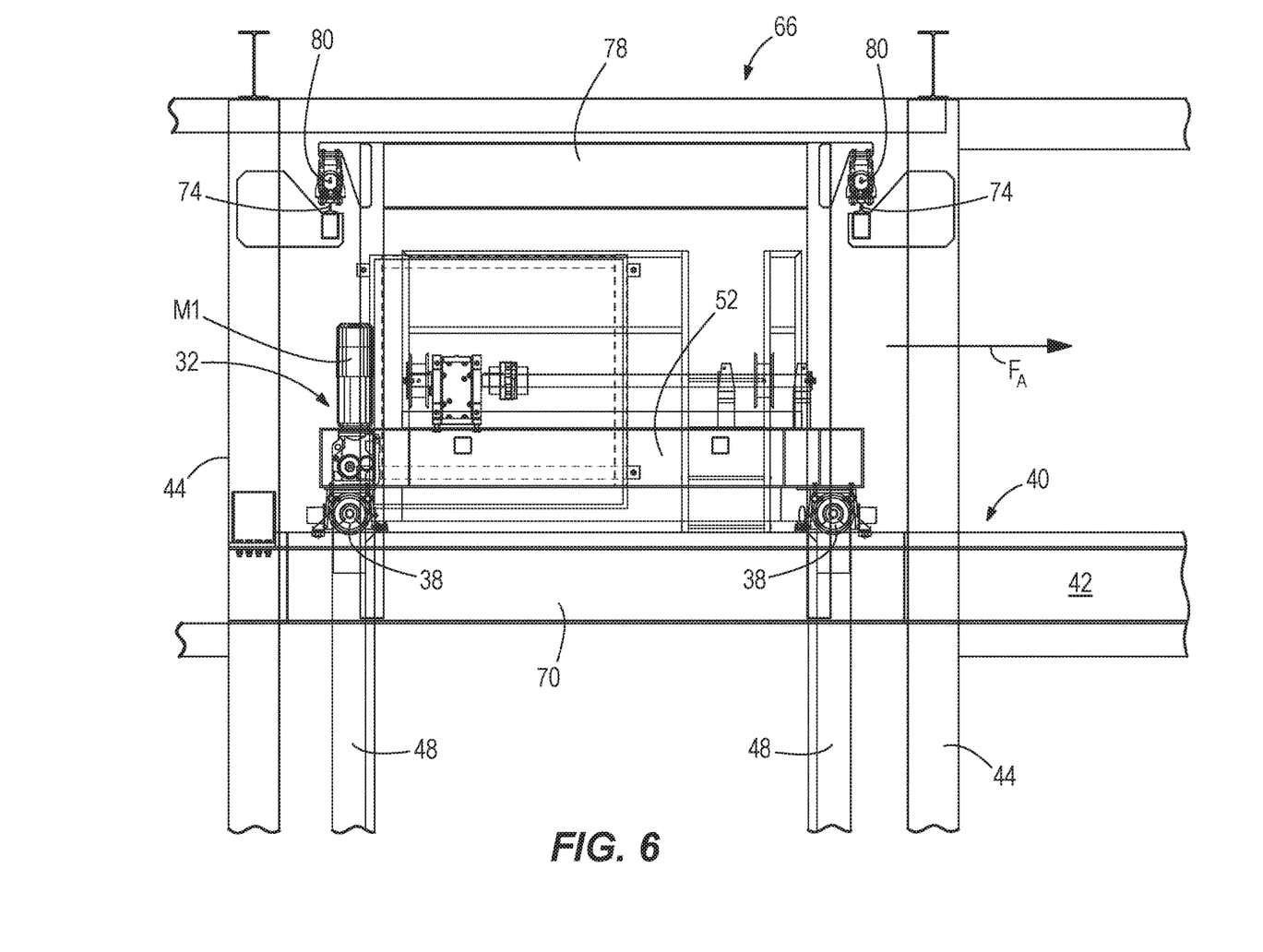
FIG. 6 is a detail view of a side transfer mechanism as shown in FIG. 2.

Although not provided in other constructions, the illustrated construction provides a secondary hoist runway 40' offset from the hoist runway 40, or "main hoist runway," and the process line. The secondary hoist runway 40' includes its own fixed rail section(s) 42' and provides an alternate path for hoists 36 to travel alongside the process line and the work stations thereof. This allows, as explained below, for a first hoist 36 to bring the workpiece 24 to the location of the side transfer mechanism 66 and disengage the workpiece 24, e.g., the workpiece 24 and skid 28 being put onto a conveyor 84, and for the first hoist 36 to return toward the upstream end of the finishing system 20 along a path that is spaced from the process line. A second hoist 36 can pick up the workpiece 24 for further transport through the process line. In the illustrated embodiment, the finishing system 20 includes two adjacent side transfer mechanisms 66, both of which are spaced from the upstream and downstream ends of the process line. The finishing system 20 further includes another side transfer mechanism 66 at the upstream end and yet another at the downstream end, although other configurations and combinations are contemplated. The illustrated layout provides for one or more hoists 36 to run along a first loop formed in part by an upstream portion of the process line, while one or more separate hoists 36 run along a second loop formed in part by a downstream portion of the process line. The loops do not intersect or overlap, but rather abut each other at the pair of adjacent side transfer mechanisms 66. The conveyor 84 mentioned above and illustrated in FIG. 4 is operable to shuttle the workpiece 24 (e.g., on the skid 28) from the upstream one to the downstream one of the adjacent side transfer mechanisms 66. The downstream loop is constructed and operates like the upstream loop, with the hoists 36 returning from the end of the loop along a path, defined by a tertiary hoist runway 40" with fixed rail section(s) 42", spaced from the process line.

In operation, a hoist 36 at the upstream end of the process line is loaded with a workpiece 24 on a skid 28, carried by a carrier 32. The workpiece 24 can be loaded to the carrier 32 on or off the process line, and the hoist 36 arrives at the upstream end by traversing the secondary hoist runway 40'. The side transfer mechanism 66 moves the movable rail section 70 at the upstream end of the process line from the secondary hoist runway 40' to the main hoist runway 40 to align the hoist 36 with the process line. The hoist 36 drives the workpiece 24 in succession to various upstream work stations (e.g., for pre-treatment), and at some or all of the work stations, the hoist 36 lowers and subsequently raises the workpiece 24 (e.g., into and out of an immersion tank, and optionally, also tilts or oscillates the workpiece 24). Upon arriving at the next side transfer mechanism 66, the hoist 36 lowers the skid 28 and the workpiece 24 onto the conveyor 84. Now unloaded and positioned on the movable rail section 70, the hoist 36 is moved to the secondary hoist runway 40' by movement of the cart 78 along the transverse shuttle rails 74. The hoist 36 thus moves in a first transverse direction with respect to the axis A1. Meanwhile, the conveyor 84 shuttles the skid 28 and the workpiece 24 laterally, in a second transverse direction with respect to the axis A1, opposite the first transverse direction of the departing hoist 36. The conveyor 84 further shuttles the skid 28 and the workpiece 24, at least partially outside the process line, into alignment with the next (e.g., directly adjacent) side transfer mechanism 66, before inserting the skid 28 and the workpiece 24 back into alignment with the process line. At this location, a second hoist 36 belonging to the second portion of the finishing system 20 engages and "picks up" the skid 28 and the workpiece 24 previously "dropped off" by the first hoist 36. The second hoist 36 traverses the second portion of the finishing system 20, including one or more work stations in which the workpiece 24 is lowered and raised (and optionally, also tilted or oscillated). The second hoist 36 delivers the workpiece 24 to the end of the second section of the finishing system 20, which as illustrated, is the end of the finishing system 20. At the end station, the workpiece 24 is unloaded from the hoist 36, and a final side transfer mechanism 66 moves the hoist 36 from the main hoist runway 40 to the tertiary hoist runway 40" so that it may return, out of the process line, to the handoff location. Each portion of the finishing system 20 can have one, two, or more than two hoists 36 running the loop, depending on the intended throughput of the system. Also, it is noted that the finishing system 20 can include additional portions or loops, subdivided by one or more additional handoff locations with side transfer mechanisms 66.

It can be seen from the above description that a workpiece transfer between hoists 36 is accomplished without the necessity of jockeying hoists back-and-forth along the process line, and without reversing any hoists 36 on the process line. However, in other operations, workpiece transfers between hoists 36 may not be performed, and additional advantages can be enjoyed by the implementation of one or more side transfer mechanisms 66 to perform a lateral hoist transfer as described further below. Rather than enabling separate loops of hoists 36 along a process line, the finishing system 100 of the following description utilizes lateral hoist transfers to side shift workpiece-laden hoists from one process line to another process line.

Figure 7:
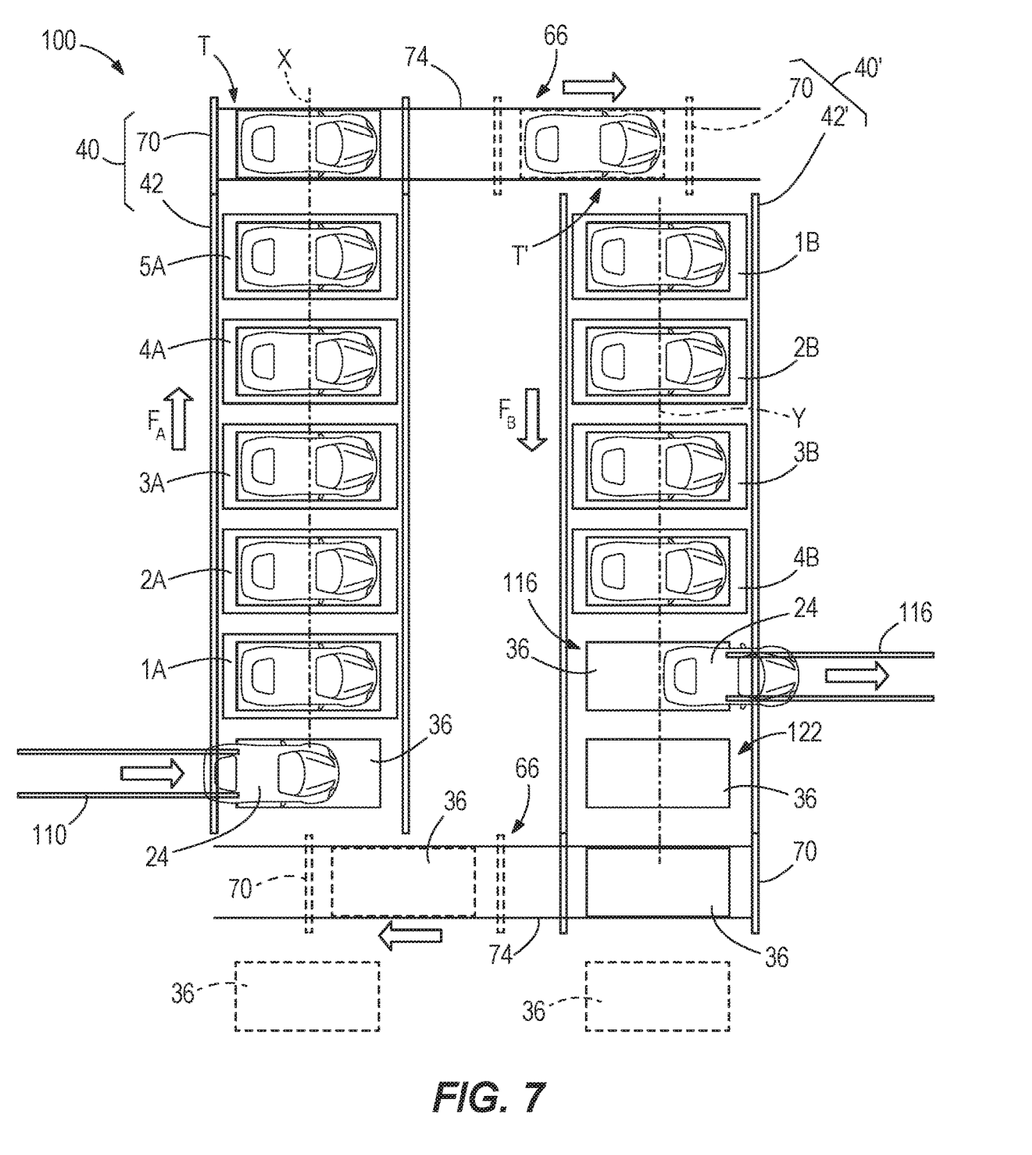
FIG. 7 is a plan view of a finishing system according to another embodiment of the present disclosure.

FIG. 7 is a plan view of a finishing system 100 formed divided into distinct process lines, or two discontinuous sections A, B (e.g., side-by-side sections as shown). As illustrated, the two sections A, B are arranged to define parallel conveyance or work flow paths with respective process line axes X, Y. Each of the first or upstream section A and the second or downstream section B is provided with a plurality of work stations. For example, the first section A includes work stations 1A to mA where "m" is the total number of first section work stations. Likewise, the second section B includes work stations 1B to nB where "n" is the total number of second section work stations. The numbers m, n may be equal or unequal. In some constructions, the difference between m and n is not greater than 1. In the non-limiting illustrative example of FIG. 7, m is 5 such that the last work station of the first section A is 5A, and n is 4 such that the last work station of the second section B is 4B. Both sections A, B are integral to a single finishing process comprising multiple treatments carried out on the workpiece 24 at the various work stations 1A to 4B. In other constructions, the two sections A, B may be distinct process lines of distinct finishing processes. Arrows $F_A$, $F_B$ illustrate the direction of forward travel through the work stations of the finishing system 100. Some or all of the work stations can include immersion tanks filled with liquid for cleaning, rinsing, and coating workpieces conveyed through the process line. In some constructions, the finishing system 100 can further include additional non-immersion work stations, such as spray stations, heating or oven sections, or inspection stations, among others. Features of the finishing system 100 not described or illustrated in explicit detail may be similar to those of the finishing system 20, or variations thereof. In particular, the finishing system 100 is illustrated in schematic form for demonstrating an alternate layout and process, with the understanding that the finishing system 100 has similar structural features as the finishing system 20, including for example, carriers 32 and hoists 36 for carrying suspended workpieces 24, and side transfer mechanisms 66 operable to side shift hoists 36 between main and secondary hoist runways 40, 40', along a transverse shuttle track 74.

Each incoming workpiece 24 can be conveyed, e.g., by a floor mount conveyor 110 such as a chain-on-edge or roller conveyor, into a starting or loading station in line with and just upstream of a first work station 1A of the first section A of the finishing system 100. The workpiece 24, which may be supported on a skid 28, can be loaded at the starting position into the workpiece carrier 32. The workpiece 24 can be an automobile unibody-constructed frame, portions of an automobile, or other manufactured goods. Each workpiece carrier 32 can be maintained in association with a single hoist 36 throughout the finishing system 100 as in the finishing system 20, or the workpiece carriers 32 can be configured (e.g., with load bars) for selective engagement with and disengagement from a variety of hoists 36.

From the starting position, the hoist 36 carries the workpiece 24 through the entire first section A of the finishing system 100 (see arrow $F_A$ directed upward along left side of FIG. 7) to the side transfer position labeled T just downstream of the last work station of the first section A. The hoist 36 moves along the fixed rail section 42 of the main hoist runway 40 along the length of the first section A (e.g., spanning the loading position and work stations 1A through mA) and moves onto the movable rail section 70 at the downstream position T. In other constructions, the side transfer position T is at the final work station mA of the first section A. Once at the side transfer position T, the side transfer mechanism 66 operates to convey the entire assembly of the hoist 36, the carrier 32 supported thereby, and the workpiece 24 supported thereby sideways (i.e., lateral or transverse to the axis X and the direction $F_A$) along the transverse shuttle track 74. Thus, the hoist 36 and all elements supported therewith undergo a side shift from the position T to the position T', which is at or just upstream of the first work station 1B of the second or downstream section B of the finishing system 100. At position T', the movable rail section 70 supporting the hoist 36 is aligned with the fixed rail section 42' of the secondary hoist runway 40'. The secondary hoist runway 40' extends along the length of the second section B (e.g., spanning stations 1B through nB and an unloading station).

During transfer of the workpiece 24 through the first and second sections A, B of the finishing system 100, additional hoists 36 carry additional respective workpieces 24 through the first and second sections A, B of the finishing system 100, such that each workpiece 24 is paired with and conveyed through the entire finishing system 100 by one and only one hoist 36. Once the hoist 36 moves the workpiece 24 away from the final work station nB, the hoist 36 moves to the unloading station 116 downstream of the final work station nB. At the unloading station 116, the workpiece 24 is uncoupled and removed from the carrier 32 (e.g., to an unloading conveyor 118 that may be similar to the loading conveyor 110). Because the process line of the finishing system 100 is divided into the two sections A, B to run in an "out-and-back" fashion (e.g., in some cases, as nearly as possible into two equal halves), the finishing system 100 generally forms a rectangle or box-shape, and the unloading station can be located adjacent the loading station as shown. This prevents the hoists 36 from having to retrace movement in a direction that is backward or in reverse with respect to the forward conveyance directions $F_A$, $F_B$. Rather, all the hoists 36 can circulate in a single process direction (clockwise as shown, including both of the directions $F_A$, $F_B$) through the multiple sections A, B of the finishing system 100. Thus, this configuration and operation enables very high throughput potential, since hoists 36 do not jockey among multiple carriers (coupling and uncoupling each time, and necessarily requiring both forward and reverse travel of the hoists 36 with respect to the direction of conveyance), and the hoists 36 leave the last work station nB of the finishing system 100 at a position near the position required to pick up a new workpiece 24 and carrier 32 to be introduced to the first section A. In some embodiments of operation, there is never an empty or unloaded hoist 36 anywhere between the first work station 1A of the finishing system 100 and the last work station nB of the finishing system 100. That is to say, every one of multiple hoists 36 can be engaged with a respective carrier 32 having therein a workpiece 24 at all times through the finishing system 100 between stations 1A and nB (whether or not there is a 100 percent capacity of hoists occupying all work stations).

Downstream of the unloading station 116, an online hoist queue station 122 can be provided. For example, the fixed rail section 42' that supports the hoist 36 though the second section B of the finishing system 100 may extend to the online hoist queue station 122 to provide a position for the hoist 36 (with empty carrier 32 following unloading) to occupy before being returned to the loading station. Further downstream of the online hoist queue station 122, a side transfer mechanism 66 for empty hoist returning can be provided and operable to return hoists 36 to a staging station upstream of the loading position at the start of the first section A. Similar to the transfer between positions T and T', the side transfer mechanism 66 that operates for empty hoist return provides a lateral hoist transfer (e.g., with the carrier 32 supported thereby) from the secondary hoist runway 40' to the main hoist runway 40, with the hoist 36 supported on a movable rail section 70 that traverses the transverse shuttle track 74. Further beyond the empty hoist return, offline hoist queue position(s) can be provided, e.g., along one or both of the first and second sections A, B as indicated by the two broken-line hoists 36 shown at the bottom of FIG. 7. The side transfer mechanisms 66 of the finishing systems 20, 100 are illustrated as providing strictly lateral movement, in a horizontal plane. However, any one or more of the side transfer mechanisms 66 may be configured to provide lateral movement that is at least partially, or predominantly lateral, but not constrained to a particular horizontal plane (e.g., if an elevation change is required or desired between a main hoist runway 40 and secondary hoist runway 40').

What is claimed is:
1. A finishing system comprising:
a workpiece carrier configured to hold a workpiece;
a plurality of work stations arranged in a row along an axis defining a process line, each of the plurality of work stations configured to receive the workpiece and treat the workpiece;
a hoist runway extending along the plurality of work stations of the process line, the hoist runway including fixed and movable rail sections;
a hoist movable along the hoist runway to traverse the plurality of work stations, wherein the hoist is coupled to the workpiece carrier to raise and lower the workpiece carrier and to move the workpiece carrier along the process line; and
a side transfer mechanism configured to move the movable rail section, with the hoist situated thereon, in a direction transverse to the axis so that the hoist is movable out of the process line.

2. The finishing system of claim 1, wherein the side transfer mechanism comprises a cart having a motor operable to drive the cart along a transverse shuttle track.

3. The finishing system of claim 2, wherein the movable rail section is fixedly secured to the cart.

4. The finishing system of claim 1, further comprising a secondary hoist runway offset from the hoist runway and the process line, wherein the side transfer mechanism is configured to move the movable rail section into alignment with a fixed rail section of the secondary hoist runway.

5. The finishing system of claim 4, wherein the side transfer mechanism comprises a cart operable to move the movable rail section along a transverse shuttle track extending between the hoist runway and the secondary hoist runway.

6. The finishing system of claim 4, wherein the secondary hoist runway extends along an additional plurality of work stations of the finishing system configured to treat the workpiece.

7. The finishing system of claim 1, wherein the hoist runway includes a pair of parallel, horizontally-spaced rails along which the hoist is drivable, such that each of the fixed and movable rail sections includes a pair of parallel, horizontally-spaced rails.

8. The finishing system of claim 1, further comprising
a conveyor positioned at a location of the movable rail section and configured to receive the workpiece from the hoist; and
a secondary hoist movable along the hoist runway and configured to receive the workpiece from the conveyor for further conveyance along the process line.

9. The finishing system of claim 8, wherein the workpiece carrier is configured to release the workpiece to the conveyor so that the workpiece carrier is movable, without the workpiece, with the hoist out of the process line, and wherein the secondary hoist has coupled therewith a secondary workpiece carrier configured to receive the workpiece from the conveyor.

10. The finishing system of claim 1, wherein the movable rail section is provided at a designated side transfer station positioned adjacent one of the plurality of work stations along the process line.

11. A method of operating a finishing system, the method comprising:
providing a plurality of work stations arranged in a row along an axis defining a process line;
loading a workpiece carrier with a workpiece;
providing a hoist movable along a runway extending along the plurality of work stations of the process line;
operating the hoist to raise and lower the workpiece carrier and the workpiece at one or more of the plurality of work stations so that the workpiece is treated at one or more of the plurality of work stations;
operating the hoist along the runway onto a movable rail section of the runway; and operating a side transfer mechanism to move the movable rail section, with the hoist situated thereon, in a direction transverse to the axis so that the hoist is moved out of the process line.

12. The method of claim 11, wherein operating the side transfer mechanism comprises energizing a motor on a cart to drive the cart, and with it the movable rail section, along a transverse shuttle track.

13. The method of claim 11, wherein operating the side transfer mechanism comprises moving the movable rail section into alignment with a secondary hoist runway offset from the hoist runway and the process line.

14. The method of claim 13, further comprising operating the hoist to move off the movable rail section and onto a fixed rail section of the secondary hoist runway.

15. The method of claim 14, wherein the secondary hoist runway extends along an additional plurality of work stations of the finishing system, the method comprising further treating the workpiece at the additional plurality of work stations.

16. The method of claim 13, wherein the workpiece is maintained with the hoist through the operation of the side transfer mechanism so that the workpiece is shuttled to the secondary hoist runway.

17. The method of claim 11, wherein the workpiece is maintained with the hoist from a first-in-line work station of the finishing system to a last-in-line work station that completes a finish applied by the finishing system.

18. The method of claim 11, further comprising releasing the workpiece from the hoist prior to operation of the side transfer mechanism so that the hoist is transferred out of the process line without a workpiece.

19. The method of claim 18, wherein the workpiece is released from the hoist to a conveyor, the method further comprising operating the conveyor to deliver the workpiece to a further downstream position along the process line, and loading the workpiece to a secondary hoist for further conveyance along the process line.

20. The method of claim 18, further comprising returning the unloaded hoist to an upstream end of the finishing system along a secondary hoist runway that extends alongside the process line.

* * * * *